United States Patent
Soroka

(10) Patent No.: US 10,895,285 B2
(45) Date of Patent: Jan. 19, 2021

(54) TORQUE CONVERTER INSTALLATION ASSIST

(71) Applicant: FORD GLOBAL TECHNOLOGIES, LLC, Dearborn, MI (US)

(72) Inventor: John D. Soroka, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1010 days.

(21) Appl. No.: 14/809,391

(22) Filed: Jul. 27, 2015

(65) Prior Publication Data
US 2017/0030414 A1 Feb. 2, 2017

(51) Int. Cl.
| | |
|---|---|
| F16D 1/08 | (2006.01) |
| F16H 47/06 | (2006.01) |
| F16H 41/24 | (2006.01) |
| F16D 1/10 | (2006.01) |
| F16H 57/00 | (2012.01) |
| F16D 1/06 | (2006.01) |

(52) U.S. Cl.
CPC ............ *F16D 1/0876* (2013.01); *F16D 1/06* (2013.01); *F16D 1/08* (2013.01); *F16D 1/10* (2013.01); *F16H 41/24* (2013.01); *F16H 47/06* (2013.01); *F16H 57/0025* (2013.01); *F16D 2001/102* (2013.01)

(58) Field of Classification Search
CPC ........... F16D 1/00–12; F16D 2001/102; F16D 2001/103; F16D 1/101; F16D 1/108; F16D 33/18; F16H 47/06; F16H 57/0018; F16H 57/0025; F16H 41/24; F16H 41/28; F15H 55/12

USPC ............................ 74/730.1; 60/358, 330, 364
See application file for complete search history.

(56) References Cited

U.S. PATENT DOCUMENTS

| | | | | |
|---|---|---|---|---|
| 2,855,802 A | * | 10/1958 | Gorsky ................... | F16H 47/08 464/105 |
| 6,059,378 A | * | 5/2000 | Dougherty ............. | B21K 25/00 301/124.1 |
| 6,276,056 B1 | * | 8/2001 | Kolodziej ............... | F16H 41/28 29/402.06 |
| 7,017,340 B2 | * | 3/2006 | Chicky ................... | F16H 41/24 60/330 |
| 7,290,987 B1 | | 11/2007 | Morin | |
| 7,412,913 B2 | * | 8/2008 | Ishikawa ................ | F16H 41/24 74/732.1 |

(Continued)

FOREIGN PATENT DOCUMENTS

| | | | |
|---|---|---|---|
| DE | 102007052778 A1 * | 5/2009 | ............... B21K 1/06 |
| WO | 2011108316 A1 | 9/2011 | |

*Primary Examiner* — William Kelleher
*Assistant Examiner* — Joseph Brown
(74) *Attorney, Agent, or Firm* — Vincent Mastrogiacomo; MacMillan, Sobanski & Todd, LLC

(57) ABSTRACT

An automatic transmission assembly includes a torque converter drivably engaged with a transmission. The torque converter has an impeller with a hub. The hub has an exterior surface, a hub end face, and a first chamfered edge between the exterior surface and the hub end face. A gear has an axial opening, a gear end face, and a second chamfered edge between the axial opening and the gear end face. First and second extensions extend from the second chamfered edge. The first and second extensions extend in a direction normal to the second chamfered edge. During indexing of the torque converter, the first and second extensions contact the first chamfered edge.

20 Claims, 7 Drawing Sheets

(56) References Cited

U.S. PATENT DOCUMENTS

| | | | |
|---|---|---|---|
| 7,565,958 B1 * | 7/2009 | Dumas | F16H 41/28 192/3.29 |
| 8,181,454 B2 * | 5/2012 | Bartos | F16H 41/30 60/358 |
| 2009/0028630 A1 * | 1/2009 | Kemmler | F16D 1/092 403/1 |
| 2011/0150670 A1 | 6/2011 | Brees et al. | |
| 2011/0154813 A1 | 6/2011 | Brees et al. | |

* cited by examiner

TORQUE CONVERTER INSTALLATION ASSIST

BACKGROUND OF INVENTION

The present invention relates to automotive powertrains and in particular to installation of a torque converter onto a transmission in an automotive powertrain.

An automotive powertrain may include a torque converter to transfer torque from a power source—e.g., an internal combustion engine—to a transmission. As is known in the art, the torque converter typically comprises an impeller receiving torque from the power source, a turbine transmitting torque to the transmission, and a stator between the impeller and turbine. The powertrain may also include an auxiliary gear installed on a hub of the impeller. The auxiliary gear may, for example, drive a transmission fluid pump. The hub has an exterior surface and the auxiliary gear has an axial opening with an interior surface. The hub extends into the axial opening. The interior surface abuts the exterior surface such that the auxiliary gear mounts on, and rotates with, the hub.

During assembly, the torque converter and the transmission may be stacked vertically. For example, the auxiliary gear may be positioned at an upper end of the stacked transmission. The torque converter may then be lowered on the auxiliary gear such that the weight of the torque converter is bearing on an end face of the auxiliary gear. The torque converter is then indexed or clocked—i.e., the torque converter is rotated—such that the interior and exterior surfaces align and the auxiliary gear may be slid into an installed position on the hub. However, when the torque converter is rotated, the auxiliary gear may also rotate because of friction between the torque converter and auxiliary gear. The friction may be produced by the weight of the torque converter bearing on the auxiliary gear during indexing. The auxiliary gear rotating with the torque converter makes alignment, and thus mounting, the auxiliary gear to the torque converter more difficult.

SUMMARY OF INVENTION

An embodiment contemplates an automatic transmission assembly. The assembly includes a torque converter and a transmission. The torque converter has a turbine and an impeller, the impeller having a hub. The transmission drivably engages the turbine. The hub has an exterior surface, a first end face, and a first chamfered edge between the exterior surface and first end face. A gear is mounted on the hub. The gear has an axial opening, a second end face, and a second chamfered edge between the axial opening and the second end face. A plurality of extensions extend, in a normal direction, from the second chamfered edge.

Another embodiment contemplates an automatic transmission assembly. The assembly includes a torque converter drivably engaged with a transmission. The torque converter has an impeller with a hub. The hub has an exterior surface, a hub end face, and a first chamfered edge between the exterior surface and the hub end face. A gear has an axial opening, a gear end face, and a second chamfered edge between the axial opening and the gear end face. First and second extensions extend from the second chamfered edge. The first and second extensions extend in a direction normal to the second chamfered edge. During indexing of the torque converter, the first and second extensions contact the first chamfered edge.

An embodiment contemplates a method of assembling an automatic transmission assembly. A torque converter and a transmission are stacked. The torque converter has an impeller hub. The hub has an exterior surface, a first end face, and a first chamfered edge between the exterior surface and the first end face. The transmission has an auxiliary gear with a plurality of extensions normal to a second chamfered edge between an axial opening and a second end face. The extensions are the only contact between the torque converter and the auxiliary gear when the torque converter and transmission are stacked. The stacked torque converter is rotated on the extensions until the hub aligns with the axial opening. The aligned torque converter hub is slid into the axial opening.

An advantage of an embodiment is that friction is reduced between the torque converter and auxiliary gear during installation of the auxiliary gear to the hub of the torque converter impeller.

DETAILED DESCRIPTION

Figure 1:
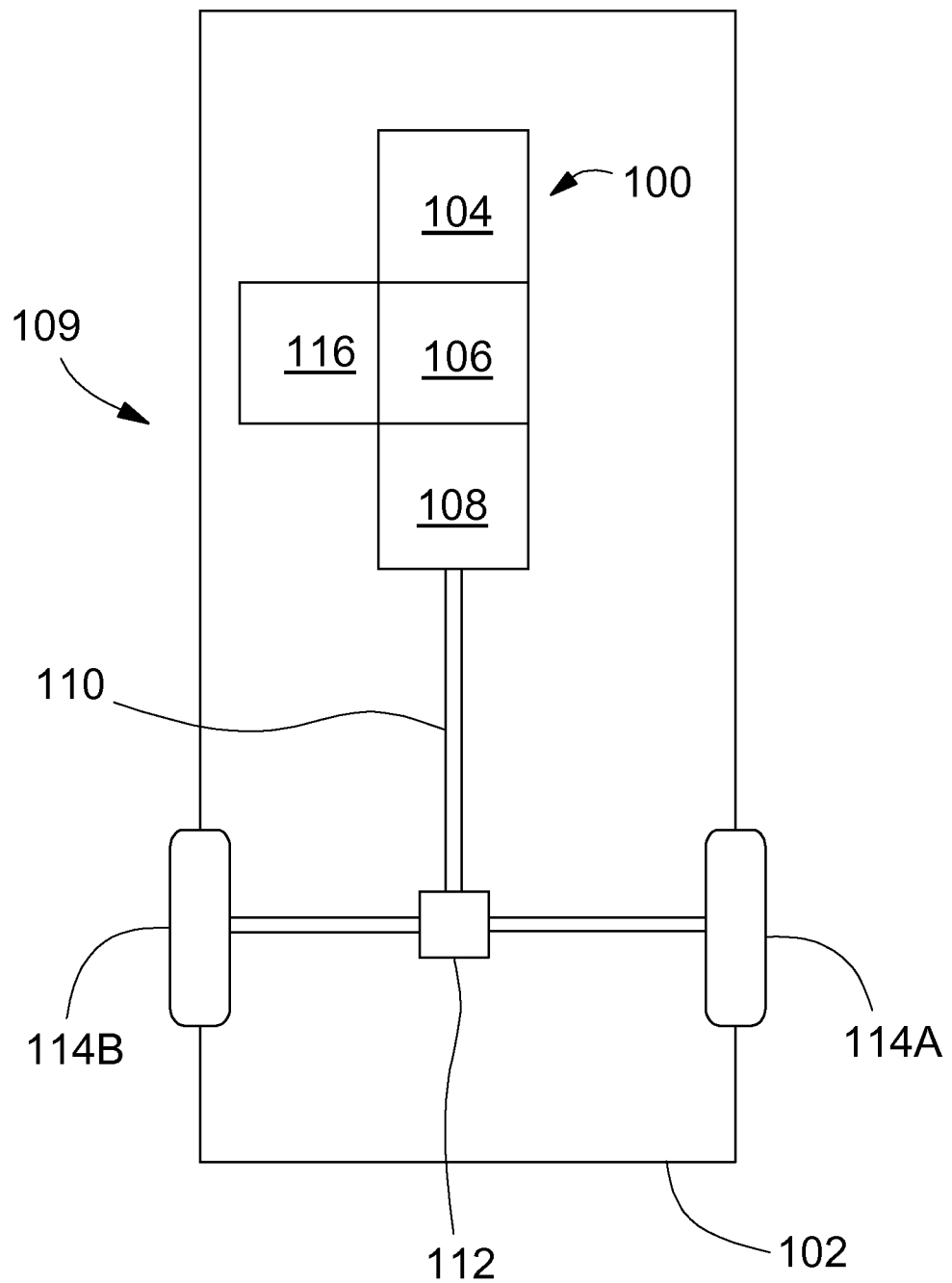
FIG. 1 is a schematic view of an automotive powertrain.

FIG. 1 schematically illustrates a powertrain, indicated generally at 100, for an automotive vehicle 102. The powertrain 100 is merely exemplary and may take other forms. For example, the powertrain 100 may be a front wheel drive, a rear wheel drive, or an all wheel drive type of powertrain.

The powertrain 100 includes a power source 104. The power source 104 may be an internal combustion engine, an electric machine, or another type of power source. The power source 104 produces torque that is transmitted to a torque converter 106. The torque converter 106 in turn transmits the torque to a transmission 108, part of a transmission assembly 109. The transmission 108 turns a driveshaft 110. Torque is transmitted by the drive shaft 110, through a differential 112, to first and second drive wheels 114A and 114B, respectively.

In addition to the transmission 108, the torque converter 106 also supplies torque to an auxiliary component 116. The auxiliary component 116 is driven by the power source 104 in addition to the transmission 108. For example, the auxiliary component 116 may be a transmission fluid pump for circulating transmission fluid through the transmission 108. Alternatively, the auxiliary component 116 may be other than a transmission fluid pump.

Figure 2:
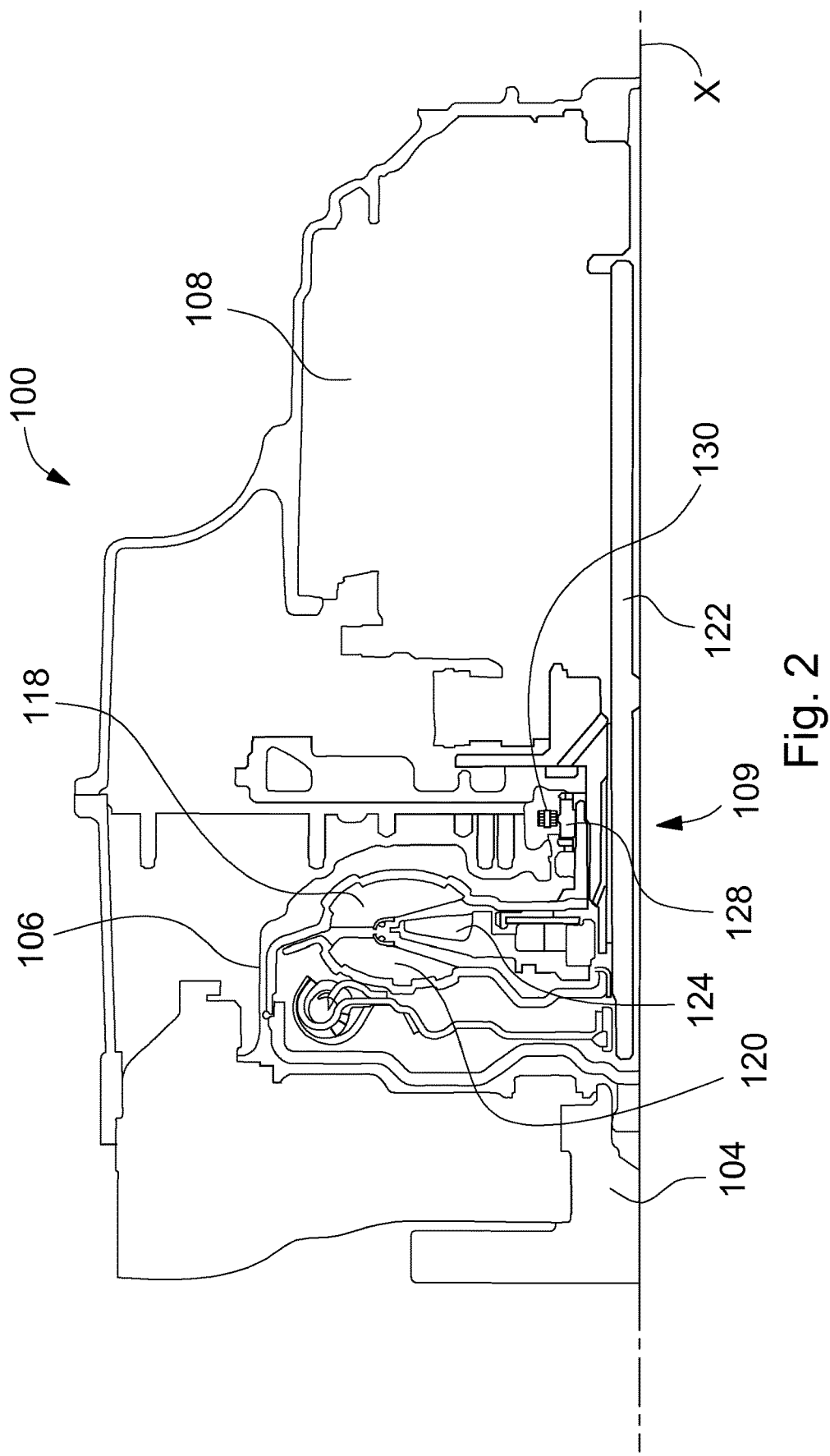
FIG. 2 is a schematic view of a portion of the automotive powertrain illustrated in FIG. 1.

FIG. 2 illustrates a portion of the powertrain 100, including the transmission assembly 109. The torque converter 106 comprises an impeller 118 coupled to and driven by the power source 104, a turbine 120 which is coupled to and drives the transmission 108 via a shaft 122, and a stator 124 between the impeller 118 and the turbine 120. The impeller 118 includes a hub 126 upon which is mounted an auxiliary gear 128. The impeller 118 supplies torque to the auxiliary component 116 via the gear 128. As illustrated, the gear 128 may be a sprocket gear that connects to the auxiliary component 116 via a chain 130. Alternatively, the gear 128 may directly mesh with a gear of the auxiliary component 116 or a gear train connected to the auxiliary component 116. The torque converter 106 is symmetrical about a centerline X.

Figure 3:
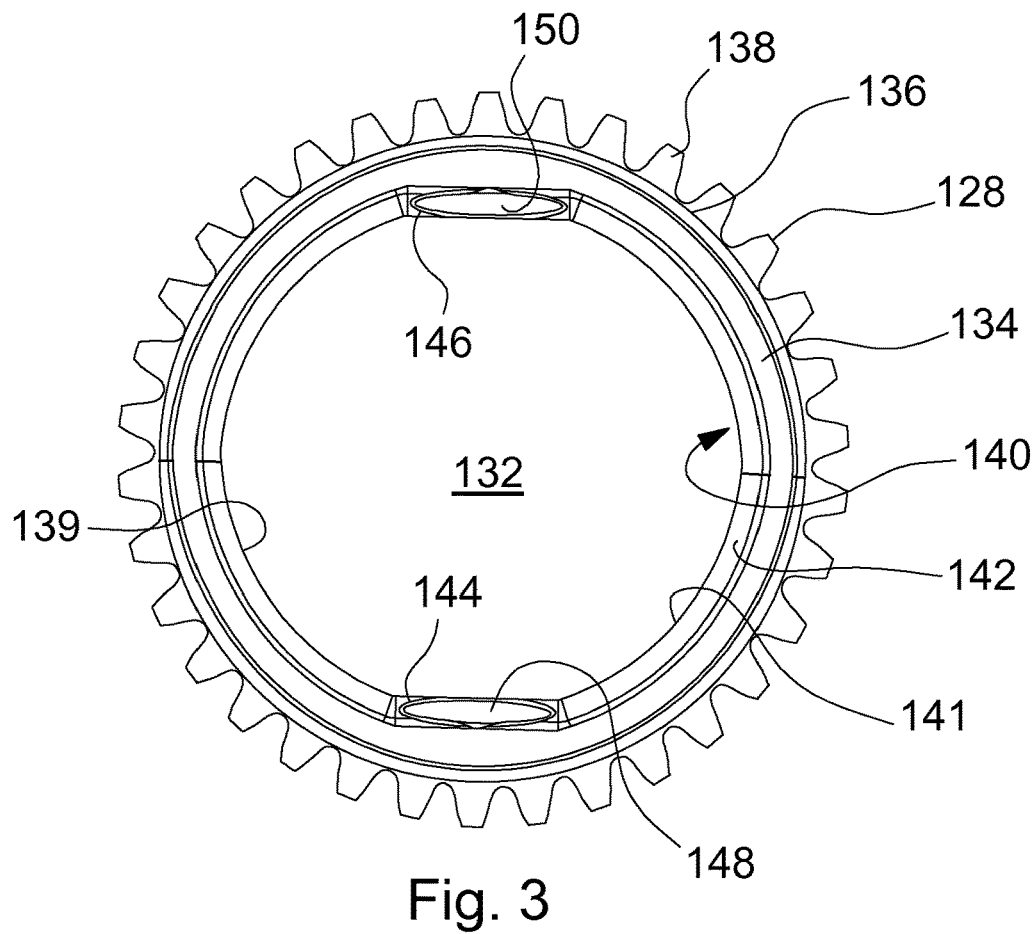
FIG. 3 is an elevation view of a gear.
Figure 4:
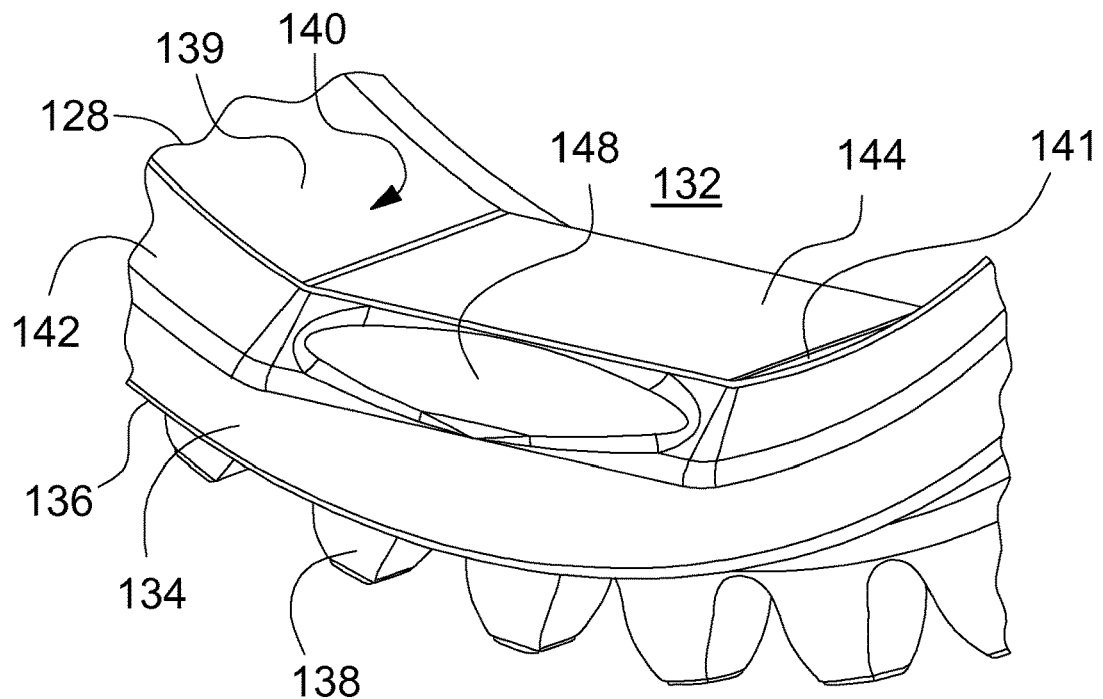
FIG. 4 is a perspective view of a portion of the gear illustrated in FIG. 3.

FIGS. 3 and 4 illustrate the gear 128. The gear 128 is a substantially circular disc with a central axial opening 132 and an axially facing end face 134. The gear end face 134 faces generally in the axial direction. A radially outer surface 136 of the gear 128 includes sprocket teeth 138 which mesh with the chain 130. The axial opening 132 has a radially interior surface 140 facing generally radially inward. Between the end face 134 and the interior surface 140 is a chamfered edge 142 that is sloped between the end face 134 and the interior surface 140 to transition between them. As illustrated, the chamfered edge 142 is at 45 degrees relative to the end face 134 and the interior surface 140. Alternatively, the edge 142 may be sloped at an angle somewhat different than forty five degrees.

As illustrated, the interior surface 140 has alternating curved constant radius portions and flat non-constant radius portions. The interior surface 140 has first and second curved constant radius portions 139 and 141, respectively, and first and second flat non-constant radius portions 144 and 146, respectively, spaced apart circumferentially. However, the gear 128 may have more or fewer of the curved and flat portions than is illustrated. As illustrated, the first and second flat portions 144 and 146, respectively, are separated by 180 degrees and located opposite each other across the axial opening 132. However, the first and second flat portions 144 and 146, respectively, may be located other than opposite each other. The first and second flat portions 144 and 146, respectively, may be referred to as D-flats. However, the first and second flat portions 144 and 146, respectively, may be other than flat. For example, the first or second flat portion 144 or 146, respectively, may be curved at a second radius different than the constant radius of the first and second curved portions 139 and 141, respectively.

Outwardly extending from the surface of the chamfered edge 142 at the first flat portion 144 is a first extension 148 and outwardly extending from the surface of the chamfered edge 142 at the second flat portion 146 is a second extension 150. As illustrated, the first and second extensions 148 and 150, respectively, are convex oval domes. Alternatively, the first and second extensions 148 and 150, respectively, may be other than oval domes. For example, the first and second extensions 148 and 150, respectively, may be outwardly extending circular domes, pyramidal shapes, or trapezoidal shapes. The term "outwardly extending" as used herein means that the first and second extensions 148 and 150 extend radially inward and axially forward from the surface of the chamfered edge 142 in order to form protrusions extending from the edge 142. As illustrated, the first and second extensions 148 and 150, respectively, extend in a direction normal to the chamfered edge 142. Alternatively, the first and second extension 148 and 150, respectively, may extend in a direction other than normal to the chamfered edge 142.

Figure 5:
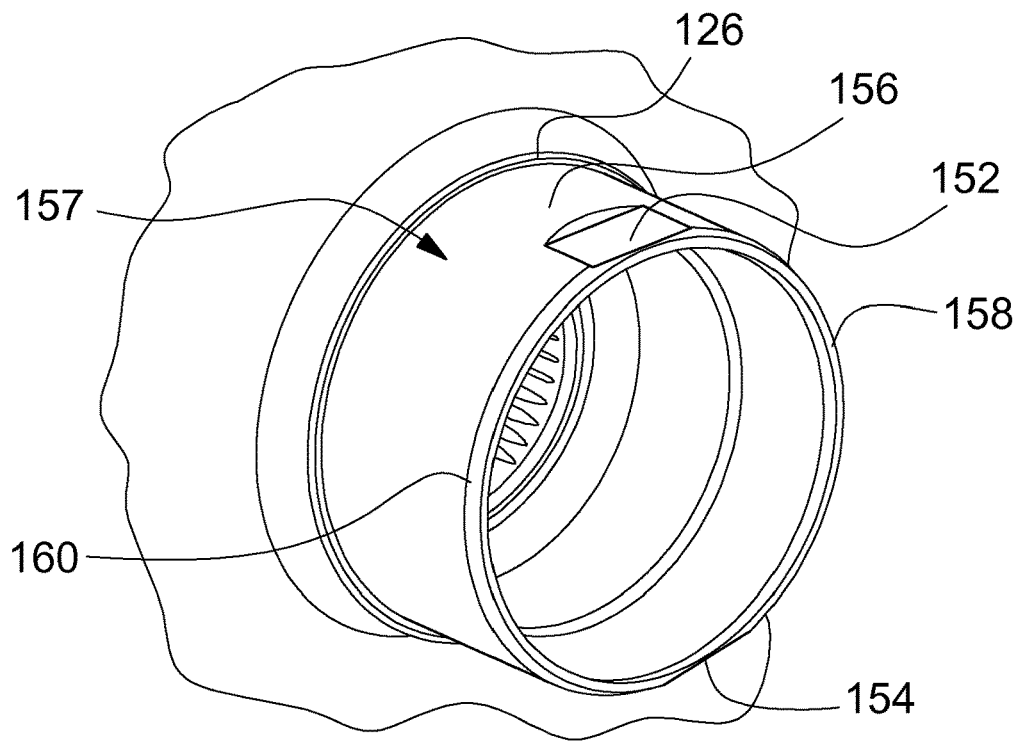
FIG. 5 is a perspective view of an impeller hub.

FIG. 5 illustrates the hub 126. The hub 126 has first and second recesses 152 and 154, respectively, spaced apart circumferentially. The first recess 152 corresponds to the first flat portion 144 of the gear 128 and the second recess 154 corresponds to the second flat portion 146 of the gear 128. When the gear 128 has more or less of the curved and flat portions than illustrated, a quantity of recesses is correspondingly adjusted such that when corresponding recesses and flat portions align, the hub 126 will slide into the axial opening 132 of the gear 128. The hub 118 has a radially exterior surface 156, an axial end face 158, and a chamfered edge 160 between the exterior surface 156 and the hub end face 158. The first and second recesses 152 and 154, respectively, are in the exterior surface 156. The exterior surface 156 also has a constant radius portion 157.

Figure 6:
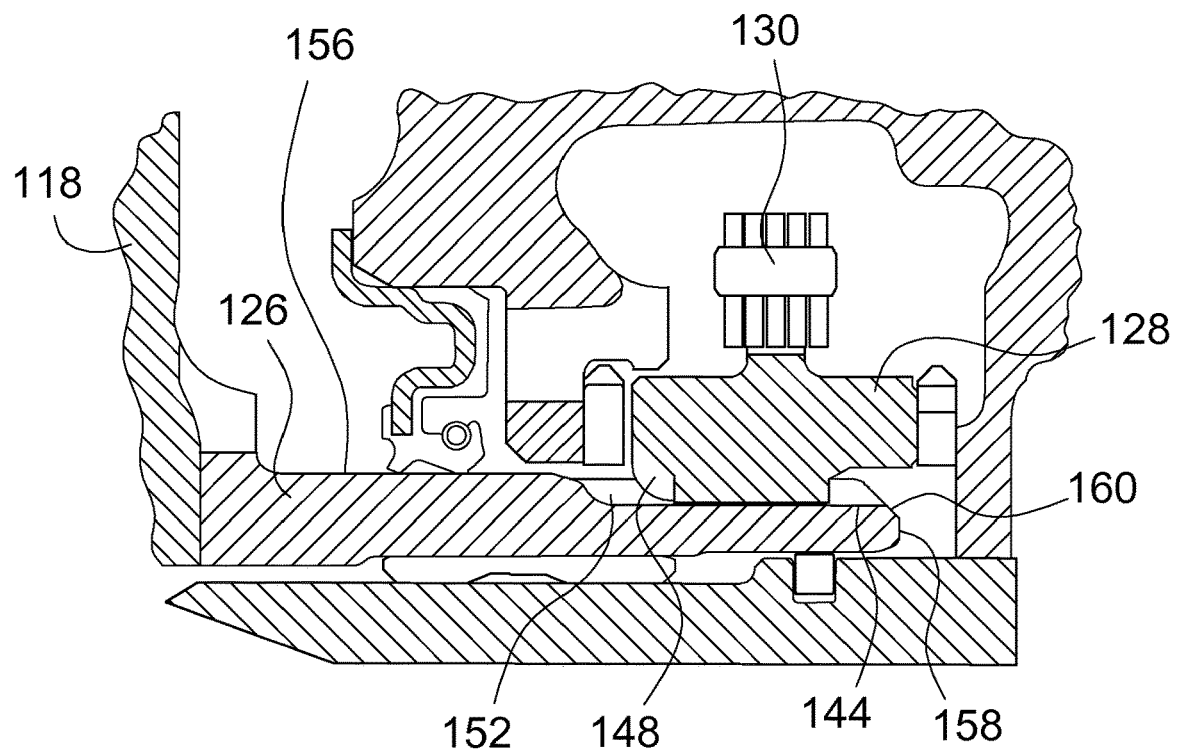
FIG. 6 is a cross section view of a portion of the automotive powertrain illustrated in FIG. 2.

FIG. 6 illustrates the gear 128 mounted on the hub 126. The hub 126 extends into the axial opening 132. The constant radius portion 157 is fitted to the first and second curved portions 139 and 141, respectively, the first recess 152 is fitted to the first flat portion 144, and the second recess 154 is fitted to the second flat portion 146. When the gear 128 is mounted on the hub 126, and the first and second curved portions 139 and 141, respectively, abut the constant radius portion 157, the first flat portion 144 abuts the first recess 152, and the second flat portion 146 abuts the second recess 154, such that the hub 126 and first gear 128 rotate together. Alternatively, the gear 128 may be mounted on the hub 126 using a spline connection for the interior surface 140 and the exterior surface 156.

Figure 7:
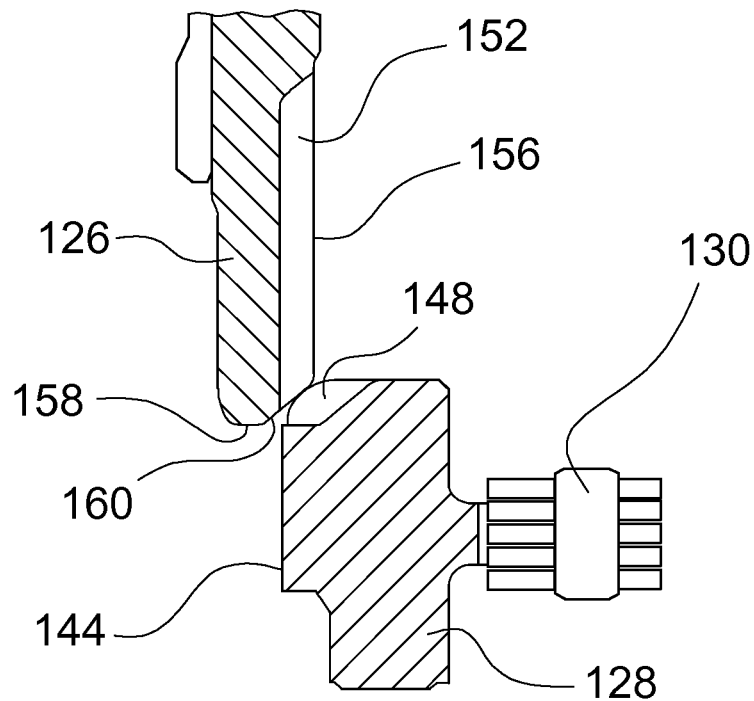
FIG. 7 is a sectional view of a portion of an automotive powertrain during assembly.
Figure 8:
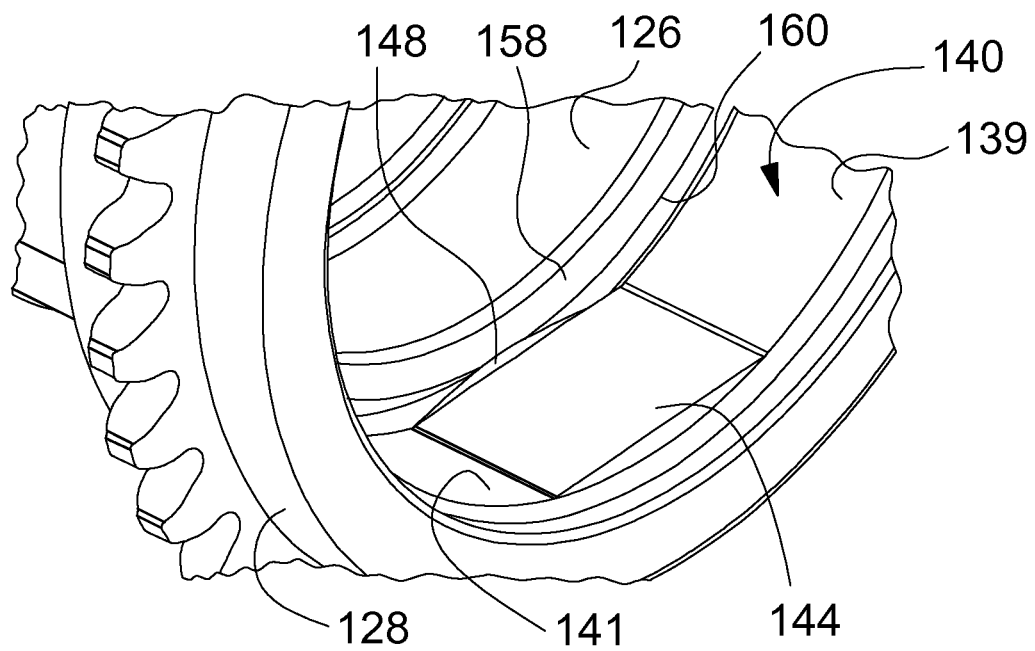
FIG. 8 is a perspective view of a portion of the automotive powertrain during assembly.
Figure 9:
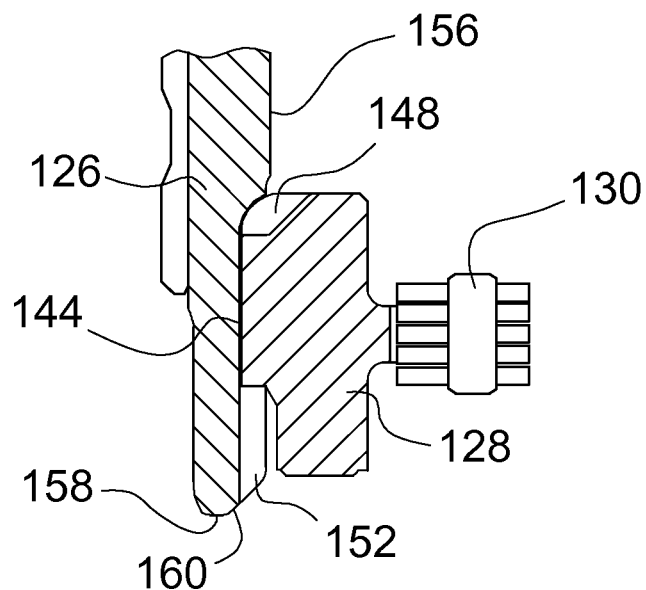
FIG. 9 is a sectional view of a portion of the automotive powertrain during assembly.

FIGS. 7-9 illustrate a portion of the assembly steps for the powertrain 100, specifically mounting of the gear 128 on the hub 126. The transmission 108 may be oriented with the central axis extending vertically and the end of the transmission 108 with the gear 128 facing up. The torque converter 106 may be located above the transmission 108 and oriented vertically—i.e., the centerline X is oriented vertically. The torque converter 106 is lowered toward the gear 128 such that, as illustrated in FIGS. 7 and 8, the hub chamfered edge 160 contacts only the first and second extensions 148 and 150, respectively. This is true because typically, when lowered, the hub 126 is not initially perfectly aligned rotationally with the gear 128. When stacked in this way, weight of the torque converter 106 bears only on the first and second extensions 148 and 150, respectively. Thus, rather than the full surface area of the hub chamfered edge 160 contacting most of the surface area of the gear chamfered area 142, the surface contact is minimal—i.e., only with the first and second extensions 148 and 150, respectively. This minimizes surface contact between the gear 128 and hub 126. As such, the first and second extensions 148 and 150, respectively, have a contact area against the hub chamfered area 160 that is less than a surface area of the gear chamfered area 142. Alternatively, the gear 128 and torque converter 106 may be reversed such that the first and second extensions 148 and 150, respectively, bear upon the hub 126.

The gear 128 will not slide onto the hub 126 until the first portion 144 is aligned with the first recess 152 and the second portion 146 is aligned with the second recess 154. Therefore, the torque converter 106 is rotated (which may include jiggling back and forth rotationally) until the first portion 144 aligns with the first recess 152 and the second portion 146 aligns with the second recess 154—i.e., the torque converter 106 is indexed or clocked. When the first portion 144 is aligned with the first recess 152 and the second portion 146 is aligned with the second recess 154, the gear 128 is aligned with the hub 126. When aligned, the weight of the torque converter 106 causes the hub 126 to drop into the gear 128 in an assembled position. The gear 128 drops onto the hub 126 to a bottomed out position illustrated in FIG. 8. Final positioning of the gear 128 on the hub 126 may be adjusted as assembly of the powertrain 100 continues.

The gear 128 may be a formed powder metal part. The first and second extensions 148 and 150, respectively, may be formed with the gear 128 during the same forming process. Alternatively, the first and second extensions 148 and 150, respectively, may be formed as separate parts and fixed to the gear 128. For example, the first and second extensions 148 and 150, respectively, may be fastened or welded to the gear 128.

Figure 10:
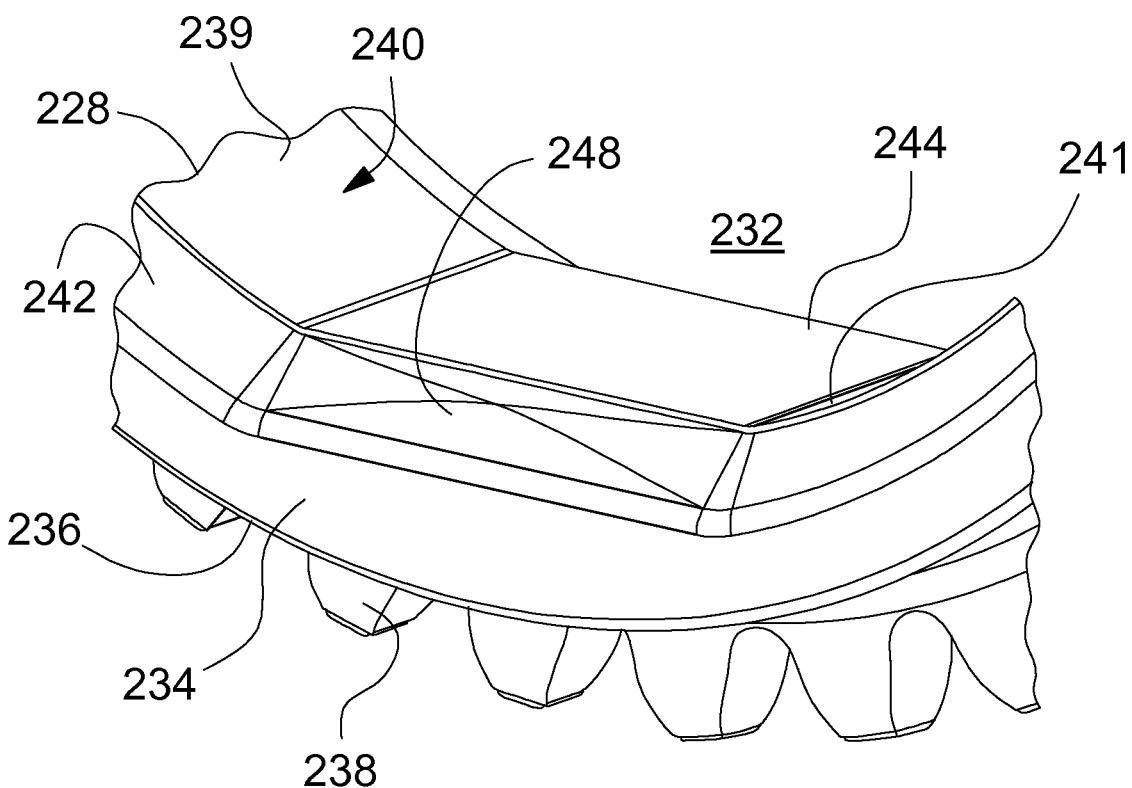
FIG. 10 is a perspective view of a portion of a gear.

FIG. 10 illustrates an auxiliary gear 228. As FIG. 10 is a variation of the gear 128 previously illustrated, like reference numerals designate corresponding parts in the drawings (but with 200 series reference numerals) and detailed description thereof will be omitted. A first extension 248 is a pyramid-shaped extension from a chamfered edge 242 rather than a curved arc.

Figure 11:
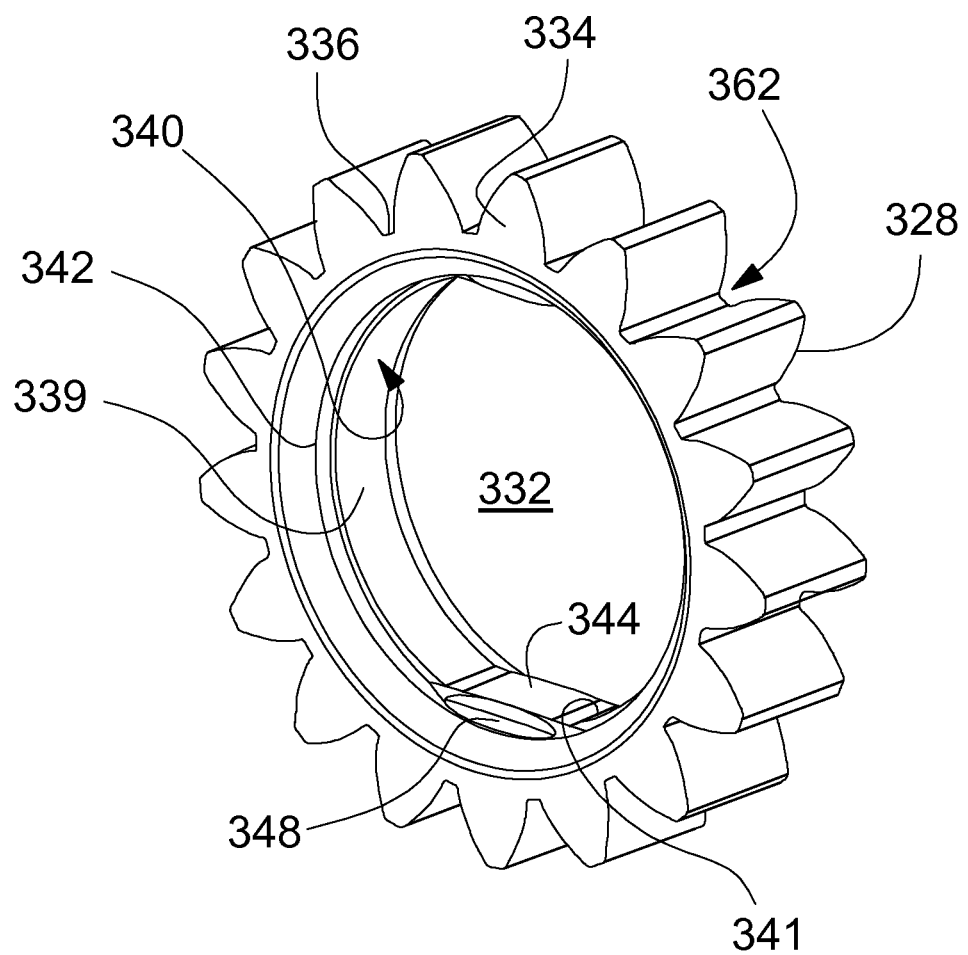
FIG. 11 is a perspective view of a gear.

FIG. 11 illustrates an auxiliary gear 328. As FIG. 10 is a variation of the gear 128 previously illustrated, like reference numerals designate corresponding parts in the drawings (but with 300 series reference numerals) and detailed description thereof will be omitted. The gear 328 has a plurality of gear teeth, indicated generally at 362, on an outside surface 336. The gear teeth 362 directly mesh with a second gear to drive an auxiliary component (not illustrated). For example, the second gear may be directly attached to the auxiliary component or may be part of a gear train.

While certain embodiments of the present invention have been described in detail, those familiar with the art to which this invention relates will recognize various alternative designs and embodiments for practicing the invention as defined by the following claims.

The invention claimed is:

1. A transmission assembly comprising:
a torque converter having an impeller having a hub with a first chamfered edge between an exterior surface and a first end face; and
a gear mounted in a transmission and on the hub and having a second chamfered edge between an interior surface defining an axial opening and a second end face, and circumferentially spaced extensions extending in a normal direction from the second chamfered edge.

2. The transmission assembly of claim 1 wherein at least one of the extensions is an oval dome.

3. The transmission assembly of claim 1 wherein at least one of the extensions is a pyramid.

4. The transmission assembly of claim 1 wherein the interior surface abuts the exterior surface.

5. The transmission assembly of claim 4 wherein the interior and exterior surfaces each comprise curved portions and flat portions, wherein the curved portions of the interior surface abut the curved portions of the exterior surface and the flat portions of the interior surface abut the flat portions of the exterior surface.

6. The transmission assembly of claim 1 wherein the extensions are configured to contact the first chamfered edge during initial mounting of the gear on the hub.

7. The transmission assembly of claim 1 wherein the extensions are configured to be the only contact between the torque converter and the gear prior to the torque converter being indexed to the gear.

8. The transmission assembly of claim 1 wherein the extensions extend toward recesses in the exterior surface.

9. The transmission assembly of claim 1 wherein the extensions extend from the second chamfered edge at locations adjacent to flat portions of the interior surface.

10. A transmission assembly comprising:
a torque converter drivably engaged with a transmission, the torque converter having an impeller with a hub, wherein the hub has a first chamfered edge between an exterior surface and a hub end face; and
a gear having a second chamfered edge between an interior surface defining an axial opening and a gear end face, and circumferentially spaced extensions extending from the second chamfered edge in a direction normal to the second chamfered edge and contacting the first chamfered edge prior to indexing of the torque converter.

11. The transmission assembly of claim 10 wherein the extensions are oval domes.

12. The transmission assembly of claim 10 wherein the interior and exterior surfaces each have constant radius portions and non-constant radius portions, the constant radius portions of the interior surface abutting the constant radius portions of the exterior surface and the non-constant radius portions of the interior surface abutting the non-constant radius portions of the exterior surface after the torque converter is indexed.

13. The transmission assembly of claim 10 wherein the extensions have a contact area against the first chamfered edge that is less than a surface area of the second chamfered edge.

14. The transmission assembly of claim 10 wherein a first extension extends from the second chamfered edge adjacent a first flat portion of the interior surface, and a second extension extends from the second chamfered edge adjacent a second flat portion of the interior surface.

15. The transmission assembly of claim 10 wherein the extensions are configured to be the only contact between the gear and hub prior to indexing of the torque converter.

16. A transmission assembly comprising:
a torque converter having an impeller having a hub with a first chamfered edge between an exterior surface and a first end face; and
a gear mounted in a transmission and on the hub and having a second chamfered edge between an interior surface defining an axial opening and a second end face, and circumferentially spaced extensions extending in a normal direction from the second chamfered edge, wherein the extensions are oval domes.

17. The transmission assembly of claim 16 wherein the extensions are configured to be the only contact between the torque converter and the gear prior to the torque converter being indexed to the gear.

18. The transmission assembly of claim 17 wherein the extensions extend from the second chamfered edge at locations adjacent to flat portions of the interior surface.

19. The transmission assembly of claim 16 wherein the extensions extend from the second chamfered edge at locations adjacent to flat portions of the interior surface.

20. The transmission assembly of claim 16 wherein the interior and exterior surfaces each comprise curved portions and flat portions, wherein the curved portions of the interior surface abut the curved portions of the exterior surface and the flat portions of the interior surface abut the flat portions of the exterior surface after the gear is indexed to the hub.

* * * * *